UNITED STATES PATENT OFFICE.

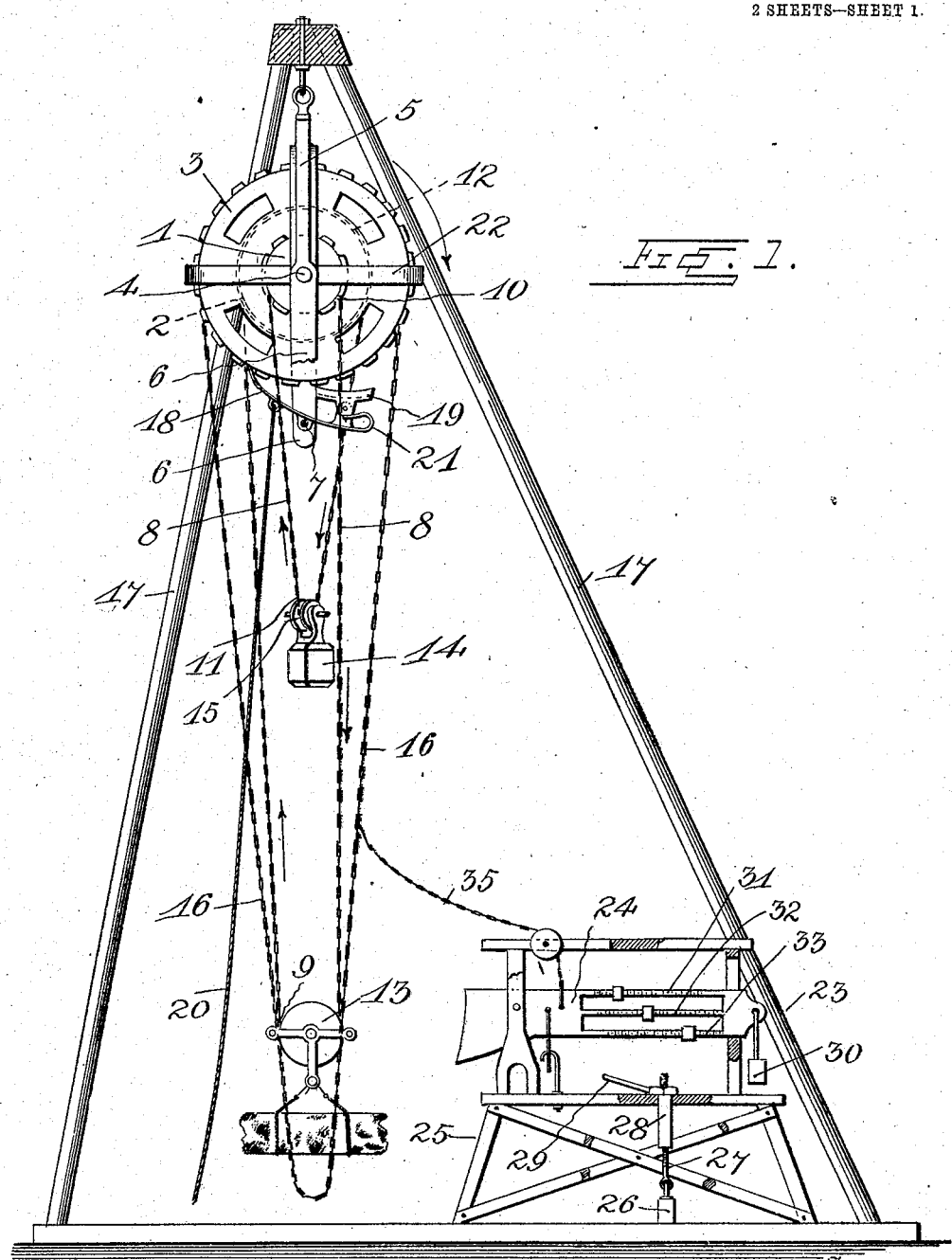

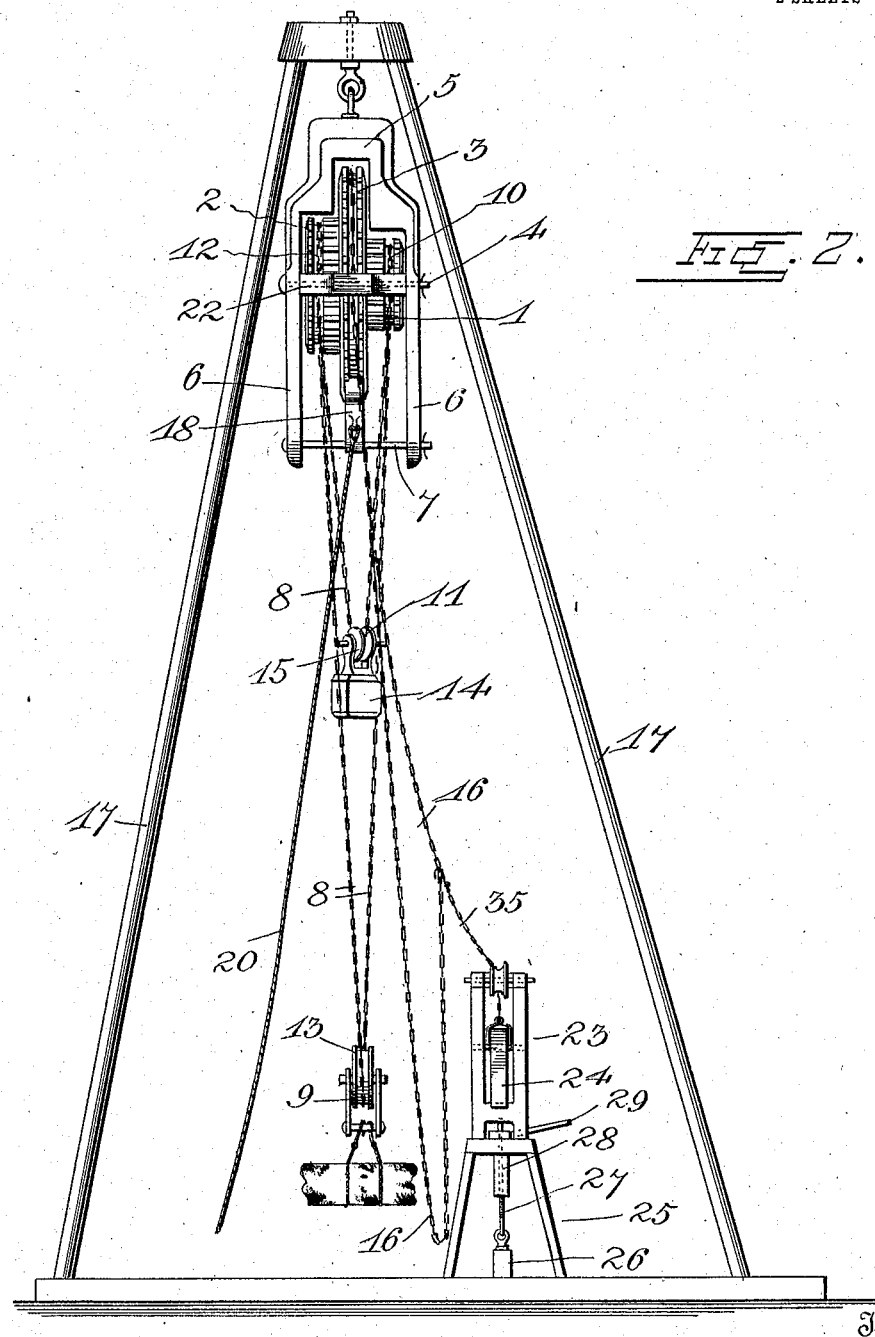

RUDOLPH H. KRUEGER, OF SPENCER, SOUTH DAKOTA.

HOISTING APPARATUS.

No. 815,440. Specification of Letters Patent. Patented March 20, 1906.

Application filed June 29, 1905. Serial No. 267,627.

*To all whom it may concern:*

Be it known that I, RUDOLPH H. KRUEGER, a citizen of the United States, residing at Spencer, in the county of McCook and State of South Dakota, have invented certain new and useful Improvements in Hoisting Apparatus; and I do declare the following to be a full, clear, and exact description of the invention, such as will enable others skilled in the art to which it appertains to make and use the same.

My invention is an improved portable hoisting apparatus adapted for use for raising and weighing loads of farm products and for also raising and weighing other commodities and which is adapted to be readily set up and to be taken down and which may be stored in a comparatively small space when not in use.

In the accompanying drawings, Figure 1 is a side elevation of a hoisting and weighing apparatus embodying my improvements, and Fig. 2 is a similar view at right angles to Fig. 1.

In the embodiment of my invention I provide a differential pulley, which comprises a member 1, a member 2 of greater diameter, and an operating member 3, which is here shown as disposed between said members 1 and 2. Each of the said members is shown as provided with peripheral sprocket-teeth. The said differential pulley has its bearings on an axle member 4, which is carried by a block 5. Said block is provided with a pair of depending arms 6, the lower ends of which are connected together by an axle-rod 7. An endless hoisting-chain 8 has four bights 9, 10, 11, and 12. A pulley 13 is engaged and suspended by the hoisting-chain and hangs in the bight 9. The bight 10 passes over the smaller pulley member 1, and the bight 12 passes over the larger pulley member 2. A weight 14 is here shown as hung by the bight 11 and as provided with a roller 15, engaged thereby; but the use of this weight 14 is optional, as its only function is to prevent the hoisting-chain from slipping on the differential-pulley members 1 2. In cases where the weight of the chain is sufficient to prevent it from slipping such weight 14 may be dispensed with. An endless operating-chain 16 passes over and engages the operating member 3 of the differential pulley, and it will be understood that when the differential pulley is turned in the direction indicated by the arrow in Fig. 1 the hoisting-chain 8 will be caused to travel in the direction indicated by the arrows thereon, the weight 14 will be lowered, and the weight represented by or attached to the pulley 13 will be raised, the leverage of the differential pulley being such as arises from the difference in the diameter of its respective members and which may be readily ascertained or calculated. By varying the size of the members of the differential pulley the same may be made of any desired power.

Within the scope of my invention any suitable means may be employed for suspending the differential pulley in an elevated position. I show a frame 17 for this purpose, which in practice may be made of poles.

In order to lock the differential pulley to cause the same to support a weight when raised, I provide a pawl 18, which is pivotally mounted on the axle-rod 7 of the hanger-block 5 and is provided at one end with a pivotally-mounted brake-shoe 19. The weight of the latter is such as to normally engage the point of the pawl with the periphery of the operating member 3 of the differential pulley, and when the latter is turned in raising a weight the said pawl by engagement successively with the respective sprocket-teeth of said operating member 3 will serve to prevent reverse rotation of the differential pulley, so that the weight may be suspended at any desired elevation. A cord 20 is attached to the pawl 18, by means of which said pawl is disengaged from the operating member 3 and caused to operate as a lever to apply the brake-shoe 19 to the periphery of said operating member in order to regulate the lowering of a weight or load. A spring 21 is provided to facilitate the application of the said brake-shoe to the said operating member. A bail 22 is provided to prevent the operating-chain 16 from becoming casually disengaged from said operating member of the differential pulley.

In connection with my improved hoisting apparatus hereinbefore described I employ a stationary scale 23, which comprises a scale-beam 24, which is mounted on a supporting stand or frame 25, which may be secured on the ground by any suitable means. I here show a stake 26, driven in the ground under said frame, a screw-hook 27, connected to the said stake, and a sleeve-nut 28, engaging the said screw and swiveled in the frame and provided with a lever 29, whereby it may be turned to cause it to draw upon or release the frame from the anchor-stake. The scale-beam 24 carries a weight 30 and is provided with a plurality of bars 31 32 33, on each of which is a sliding weight. The weight on the lower bar 33 when the weight of the bars 31 32 are at the inner ends of said bars is to enable the scale-beam to be used for ordinary weighing purposes. The weight on the bar 31 is a counterbalancing-weight to compensate for the weight of the hoisting-tackle, and the weight on the bar 32 is for weighing the load raised by the hoisting-tackle. A chain 35 is here shown as attached to the scale-beam 24 and provided with a hook for engagement with the operating-chain 16 when the load to be weighed has been hoisted, so that when the pawl has been disengaged from the differential pulley the consequent tension of the operating-chain 16 will cause the free end of the scale-beam to be raised, and by appropriately moving the weight on the bar 32 thereof the weight of the said load may be readily ascertained.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. Hoisting apparatus comprising a differential pulley, operating-tackle therefor, a pawl to engage a member of the differential pulley, and a brake-shoe carried by the said pawl, serving by its weight to normally engage the frame with the differential pulley and applied by the pawl to the differential pulley when the pawl is disengaged therefrom.

2. Hoisting apparatus comprising a differential pulley, operating-tackle therefor, a pawl to engage a member of the differential pulley, a brake-shoe pivotally mounted on the pawl, serving by its weight to normally engage the pawl with the differential pulley and applied by the pawl to the differential pulley when the pawl is disengaged therefrom, and a spring carried by the pawl and bearing against the brake-shoe, to facilitate the application of the latter to the differential pulley.

In testimony whereof I have hereunto set my hand in presence of two subscribing witnesses.

RUDOLPH H. KRUEGER.

Witnesses:
WM. HOESE,
J. E. SURBER.